United States Patent
Alejos et al.

(10) Patent No.: US 8,610,621 B1
(45) Date of Patent: Dec. 17, 2013

(54) EXTENDED OPTIMAL FILTERS FOR ADAPTIVE RADAR SYSTEMS USING BINARY CODES

(75) Inventors: Ana Vazquez Alejos, Las Cruces, NM (US); Muhammad Dawood, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 194 days.

(21) Appl. No.: 13/196,536

(22) Filed: Aug. 2, 2011

Related U.S. Application Data

(60) Provisional application No. 61/370,773, filed on Aug. 4, 2010.

(51) Int. Cl.
*G01S 13/00* (2006.01)

(52) U.S. Cl.
USPC ............. 342/60; 342/189; 342/195; 342/202

(58) Field of Classification Search
USPC ............................. 342/60, 82, 175, 195, 202
See application file for complete search history.

(56) References Cited

U.S. PATENT DOCUMENTS

| | | | |
|---|---|---|---|
| 4,156,876 A | 5/1979 | Debuisser | |
| 4,259,650 A | 3/1981 | Donahue | |
| 4,901,082 A | 2/1990 | Schreiber et al. | |
| 5,070,337 A | 12/1991 | Chen et al. | |
| 5,481,270 A | 1/1996 | Urkowitz et al. | |
| 5,786,788 A | 7/1998 | Schober et al. | |
| 7,224,716 B2 * | 5/2007 | Roman | 375/142 |
| 7,327,307 B2 | 2/2008 | Adams et al. | |
| 7,430,257 B1 * | 9/2008 | Shattil | 375/347 |
| 7,492,312 B2 | 2/2009 | Fam et al. | |
| 7,929,596 B2 * | 4/2011 | Lakkis | 375/229 |
| 8,380,770 B1 * | 2/2013 | Nuthalapati | 708/300 |
| 2008/0111734 A1 * | 5/2008 | Fam et al. | 342/195 |
| 2008/0219387 A1 * | 9/2008 | Choi et al. | 375/346 |

OTHER PUBLICATIONS

Ackroyd, M. H. et al., "Optimum mismatched filters for sidelobe suppression", IEEE Transactions on Aerospace and Electronic Systems, vol. 9, No. 2, Mar. 1973, 214-218.

Alejos, Ana V. et al., "Design of a pseudorandom reference codes for reduced sidelobes and spectrally clean out-of-band emissions using an extended optimal filtering approach", Conference paper, IEEE APS International Symposium, Toronto, Canada, Jul. 11, 2010.

Alejos, Ana V. et al., "Improvement of Wideband Radio Channel Swept Time-Delay Cross-Correlation Sounders by Using Golay Sequences", IEEE Transactions on Vehicular Technology, vol. 56, No. 1, IEEE, Jan. 2007, 362-368.

(Continued)

*Primary Examiner* — John B Sotomayor
*Assistant Examiner* — Marcus Windrich
(74) *Attorney, Agent, or Firm* — Jeffrey D. Myers; Deborah A. Peacock; Peacock Myers, P.C.

(57) ABSTRACT

A method for transmission and detection in an adaptive-on-transmit (AT) system operating in the electromagnetic spectrum comprising determining a waveform-filter pair; and employing the waveform-filter pair in transmission and detection, wherein two or more are provided of the group consisting of an auto-correlation function sidelobe level reduction proportional to a the filter length, K, or better, an out-of-band spectral suppression of at least about 40 dB, and a frequency spectrum power tail power decay of K−4 or better.

9 Claims, 8 Drawing Sheets

(56) References Cited

OTHER PUBLICATIONS

Athans, Michael et al., "Optimal Waveform Design via Control Theoretic Concepts", Information and Control, Vp;/ 10, Academic Press, Inc., 1967, 335-377.

Bell, Mark R., "Information Theory and Radar Waveform Design", IEEE Transactions on Information Theory, vol. 39, No. 5, IEEE, Sep. 1993, 1578-1597.

Bhatt, T. D. et al., "Design of frequency-coded waveforms for target detection", IET Radar Sonar Navig., vol. 2, No. 5, 2008, 388-394.

Chen, Chao-Yu et al., "Complete Complementary Codes and Generalized Reed-Muller Codes", IEEE Communications Letters, vol. 12, No. 11, IEEE, Nov. 2008, 849-851.

DeLong, Jr., D. F. et al., "On the Design of Optimum Radar Waveforms for Clutter Rejection", IEEE Transactions on Information Theory, vol. IT13, No. 3, 1967, 454-463.

Gjessing, D. T., "Target Adaptive Matched Illumination Radar: Principles and Applications", Peter Peregrine Ltd. On behalf of the Institution of Electrical Engineers, 1986, 8-83.

Griep, K. R. et al., "Polyphase codes and optimal fileters for multiple user ranging", IEEE Transactions on Aerospace and Electronic Systems, vol. 31, No. 2, Apr. 1995, 752-767.

Griffiths, H. D. et al., "Developments in Radar Waveform Design", 12th International Conference on Microwaves and Radar (MIKON), vol. 4, May 1998, 56-76.

Guerci, Joseph R. et al., "Theory and Application of Optimum Transmit-Receive Radar", IEEE International Radar Conference, 2000, 705-709.

Kayani, J. K., "Development and Application of Spread Spectrum Ultrasonic Evaluation Technique", Ph.D. Dissertation, Iowa State University, Ames, IA., 1996.

Kincaid, Thomas G., "On Optimum Waveforms for Correlation Detection in the Sonar Environment: Reverberation-Limited Conditions", The Journal of the Acoustical Society of America, vol. 44, No. 3, Feb. 4, 1968, 787-796.

Kincaid, Thomas G., "Optimum Waveforms for Correlation Detection in the Sonar Environment: Noise-Limited Conditions", The Journal of the Acoustical Society of America, vol. 43, No. 2, 1968, 258-268.

Lee, S. P. et al., "Optimum Signal and Filter Design in Underwater Acoustic Echo Ranging Systems", IEEE Transactions on Aerospace and Electronic Systems, vol. AES-9, No. 5, Sep. 1973, 701-713.

Lee, W. K. et al., "Integrated sidelobe energy reduction technique using optimal polyphse codes", Electronics Letters, vol. 35, No. 24, Nov. 25, 1999, 2090-2091.

Lee, Woo-Kyung, "A Pair of Asymmetric Weighting Receivers and Polyphase Codes for Efficient Aperiodic Correlations", IEEE Communications Letters, vol. 10, No. 5, IEEE, May 2006, 387-389.

Levanon, N., "Cross-correlation of long binary signals with longer mismatched filters", IEEE Proc. Radar, Sonar and Navigation, 2005, 1-5.

Levanon, N. et al., "Range sidelobes blanking by comparing outputs of contrasting mismatched filters", IET Radar Sonar Navig., vol. 3, Iss. 3, Institute of Engineering and Technology, 2009, 265-277.

Levanon, Nadav, "Noncoherent Radar Pulse Compression Based on Complementary Sequences", IEEE Trans. on Aerospace and Electronic Systems, vol. 45, No. 2, Apr. 2009, 742-747.

Lewis, Bernard L. et al., "Linear Frequency Modulation Derived Polyphase Pulse Compression Codes", IEEE Transactions on Aerospace and Electronic Systems, vol. AES-18, No. 5, Sep. 1982, 637-641.

Lewsi, B. L. et al., "A New Class of Polyphase Pulse Compression Codes and Techniques", IEEE Transactions on Aerospace and Electronic Systems, vol. AES-17, No. 3, IEEE, May 1981, 364-372.

Liu, B., "Orthogonal Discrete Frequency-Coding Waveform Set Design with Minimized Autocorrelation Sidelobes", IEEE Transactions on Aerospace and Electronic Systems, vol. 45, No. 4, Oct. 2009, 1650-1657.

Liu, John et al., "Design of Binary Multiple Level Sequences", IEEE Transactions on Aerospace and Electronic Systems, vol. 47, No. 1, IEEE, Jan. 2011, 26-36.

Molina, A. et al., "Application of Mismatched Filter Theory to Bandpass Impulse Response Measurements", Electronics Letters, vol. 29, No. 2, Jan. 21, 1993, 162-163.

Narayanan, R. M. et al., "Radar penetration imaging using ultra-wideband (UWB) random noise waveforms", IEE Proc-Radar Sonar Navig., vol. 151, No. 3, Jun. 2004, 143-148.

Nunn, Carroll J. et al., "Best-Known Autocorrelation Peak Sidelobe Levels for Binary Codes of Length 71 to 105", IEEE Transactions on Aerospace and Electronic Systems, vol. 44, No. 1, Jan. 2009, 392-395.

Nunn, Carroll J. et al., "Polyphase Pulse Compression Codes with Optimal Peak and Integrated Sidelobes", IEEE Transcations on Aerospace and Electronic Systems, vol. 45, No. 2, Apr. 2009, 775-781.

Richards, Mark A., et al., *Principles of Modern Radar: Basic Principles*, Scitech Publishing, Inc., 2010, pp. 79-107.

Searle, S. J. et al., "Formation of Ambiguity Functions with Frequency-Separated Golay Coded Pulses", IEEE Transactions on Aerospace and Electronic Systems, vol. 45, No. 4, IEEE, Oct. 2009, 1580-1597.

Sebt, M. A. et al., "Orthogonal frequency-division multiplexing radar signal design with optimized ambiguity function and low peak-to-average power ratio", IET Radar Sonar Navig., vol. 3, Issue 2, Institute of Engineering and Technology, 2009, 122-132.

Shinriki, M. et al., "Periodic binary codes with zero and small time sidelobe levels", IEEE Proc.-Radar Sonar Navig., vol. 153, No. 6, Dec. 2006, 482-486.

Van Trees, Harry L., *Optimum Array Processing*, Wiley Interscience, New York, 2002, pp. 353-368, 864-885.

Van Trees, Harry L., "Optimum Signal Design and Processing for Reverberation-Limited Environments", IEEE Transactions on Military Electronics, vol. 9, No. 3, 1965, 212-229.

\* cited by examiner

EXTENDED OPTIMAL FILTERS FOR ADAPTIVE RADAR SYSTEMS USING BINARY CODES

CROSS-REFERENCE TO RELATED APPLICATIONS

This application claims priority to and the benefit of the filing of U.S. Provisional Patent Application Ser. No. 61/370,773, entitled "Extended Optimal Filters for Adaptive Radar Systems Using Binary Codes", filed on Aug. 4, 2010, and the specification thereof is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

COPYRIGHTED MATERIAL

Not applicable.

BACKGROUND OF THE INVENTION

1. Field of the Invention (Technical Field)

The present invention relates to extended optimal filtering methods, systems, apparatuses, and computer software for adaptive on-transmit pseudorandom noise radar waveforms. Embodiments of the present invention thus simultaneously provide low sidelobe level and spectral purity without degrading the main peak of the auto-correlation function.

2. Description of Related Art

In radar applications, appropriate transmit waveforms are of vital importance for target detection, non-ambiguous estimation of range and range-rate, accuracy, resolution, and clutter rejection. Therefore, the radar designer has to carefully examine and choose the transmit waveforms to achieve the desired objectives of the intended system. In general, the optimal design involving both hardware and software components usually perform optimally under specific operational conditions for which the system was designed. The performance of such a system may degrade if the operational environment undergoes an adverse change. Examples of such environmental degradation could include, among others, increasing noise level, changing propagation channel, jamming or interference(s), the nature of the targets, and so on. The radar system should, therefore, be capable of dynamically adjusting system parameters to optimize its performance. Adaptive techniques such as antenna beamforming or space-time adaptive processing, mainly at the receiver end, have been tried to mitigate these effects.

At the transmitter end, the adaptive-on-transmit (AT) methodologies based on the waveform design constitute the biggest family of AT approaches. The concept of AT is not new, having been considered at various stages in the past. Technological advances over the last couple of decades in generating and manipulating digital waveforms have provided further impetus to real-time AT waveforms. AT methodologies can be further subdivided into waveform selection and waveform design. In the first case, the parameters of the transmitted signal can be adaptively selected from a predefined set. In the second case, the parameters are dynamically estimated according to the changing operational environment, thereby demanding large computational power. Both AT techniques, selection or design, are further constrained by the system hardware limitations. The trade-off between the system capabilities and the waveform-based AT approach makes it much harder to design an optimal performing system under all operational conditions.

Waveform-filter pair is yet another AT technique that has been developed to overcome the constraint imposed upon the waveform selection and/or design technique. This technique has an additional advantage in terms of the sidelobe reduction of the auto-correlation function (ACF) for systems utilizing noise-like pseudorandom binary sequences (PRBS, also called PN or m-sequences). PRBS waveforms offer certain performance advantages over other deterministic waveforms. These include low probability of detection (LPD) and intercept (LPI), better immunity to external electromagnetic interference (EMI), improved spectral efficiency, and immunity to jamming. A pictorial representation of a waveform-filter pair is illustrated in FIG. 1. In that technique, an input digital binary code is transformed into a new code via a matrix transformation A. This matrix acts on some features of the original code, as the sidelobe level noise, so it can be seen as a filter. The resulting output is a new code, called reference code. In a typical radar system, the use of PRBS, however, gives rise to high correlation sidelobes (SL) also called code self noise. SL is a well known problem in radar and communication systems that use binary sequences. The code self-noise makes it harder to detect the weaker echoes from smaller targets, thereby limiting the dynamic range of the radar system utilizing such waveforms. Different techniques have been proposed to minimize the SL level; these include windowing, coding, mismatched filtering, and others. Overall system performance can attain real-time enhanced detection performance by dynamically adapting the parameters of the transmitted waveforms such that SL reduction is achieved. Adaptive SL mitigation technique is however linked to the length M of the sequence. Although, varying the sequence length M to reduce the SL level can be seen as an effective AT technique, subject to hardware constraints, it usually works in trade-off with the spectral purity of the transmitted waveform. In general, binary sequences have significant out-of-band spectral leakage and are not spectrally clean or fully band-limited. Spectrally clean transmitted waveform is, however, an important design issue, if emission control levels must be respected. It also influences other system operational features, such as LPD and LPI.

There is thus a need for a method and system which simultaneously provides low sidelobe level and spectral purity without degrading the main peak of the auto-correlation function.

BRIEF SUMMARY OF THE INVENTION

The present invention is of a method for transmission and detection in an adaptive-on-transmit (AT) system operating in the electromagnetic spectrum, comprising: determining a waveform-filter pair; and employing the waveform-filter pair in transmission and detection; and wherein two or more are provided of the group consisting of an auto-correlation function sidelobe level reduction proportional to a the filter length, K, or better, an out-of-band spectral suppression of at least about 40 dB, and a frequency spectrum power tail power decay of K-4 or better. In the preferred embodiment, all three are provided of an auto-correlation function sidelobe level reduction proportional to a the filter length, K, or better, an out-of-band spectral suppression of at least about 40 dB for pseudorandom binary sequences (PRBS), and a frequency spectrum power tail power decay of K-4 or better. No distortion of the auto-correlation function peak occurs. Symmetric codes can be employed, most preferably Barker codes and/or Golay sequences. Non-symmetric codes can be employed, most preferably pseudorandom binary sequences. The invention is especially useful in digital communications systems and imaging radar systems.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

An embodiment of the present invention relates to an improved optimal filtering technique resulting in longer reference codes with three simultaneously improved features (or at least two of the three) that usually work in trade-off:

1) the auto-correlation function sidelobe level is reduced in direct proportion to the filter length, K;
2) the out-of-band spectral suppression is at least about 40 dB for Pseudorandom Binary Sequence (PRBS); and
3) the frequency spectrum tail presents a power decay given by $K^{-4}$, offering good out-of-band frequency suppression.

Embodiments of the present invention provide desirable results in binary sequences, including but not limited to pseudorandom binary sequences (PRBS), Barker, and Golay complementary codes. The codes are also Doppler resistant and offer good multipath capabilities—two features that are not usually found in codes designed to achieve low sidelobe levels.

Embodiments of the present invention provide an optimal waveform-filter pair as an AT approach to simultaneously achieve both lower aperiodic autocorrelation function (ACF) sidelobe levels and spectrally clean waveforms with an out-of-band suppression (OBS) level directly proportional to the filter length K'≥2·M. The outcome is a longer or extended code. The main ACF peak, however, remains unaffected, thereby enhancing the dynamic range of the system and its ability to detect weaker returns. Embodiments of the present invention are also Doppler resistant, thus resulting in an opposite tendency for the waveforms designed to achieve minimum ACF SL.

Classical Optimal Filters

Figure 4:
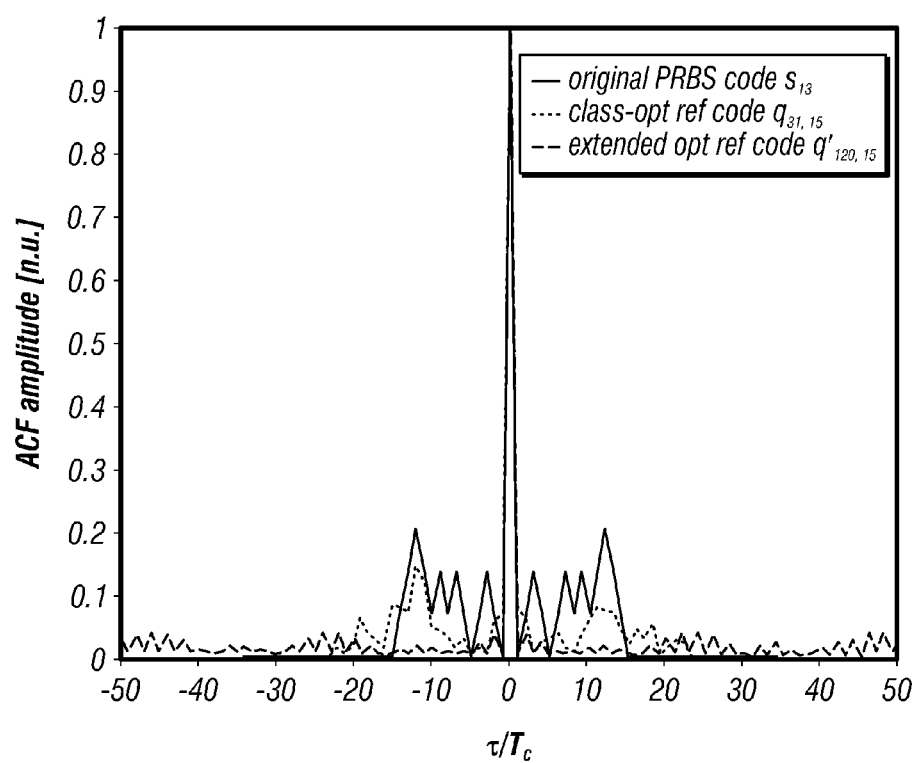
FIGS. 4 and 5 are graphs illustrating the ACF and the frequency spectrum for the cases: (i) original PRBS with length M=15; (ii) the classical optimal code with K=31; and (iii) the extended optimal code with K'=120.
Figure 5:
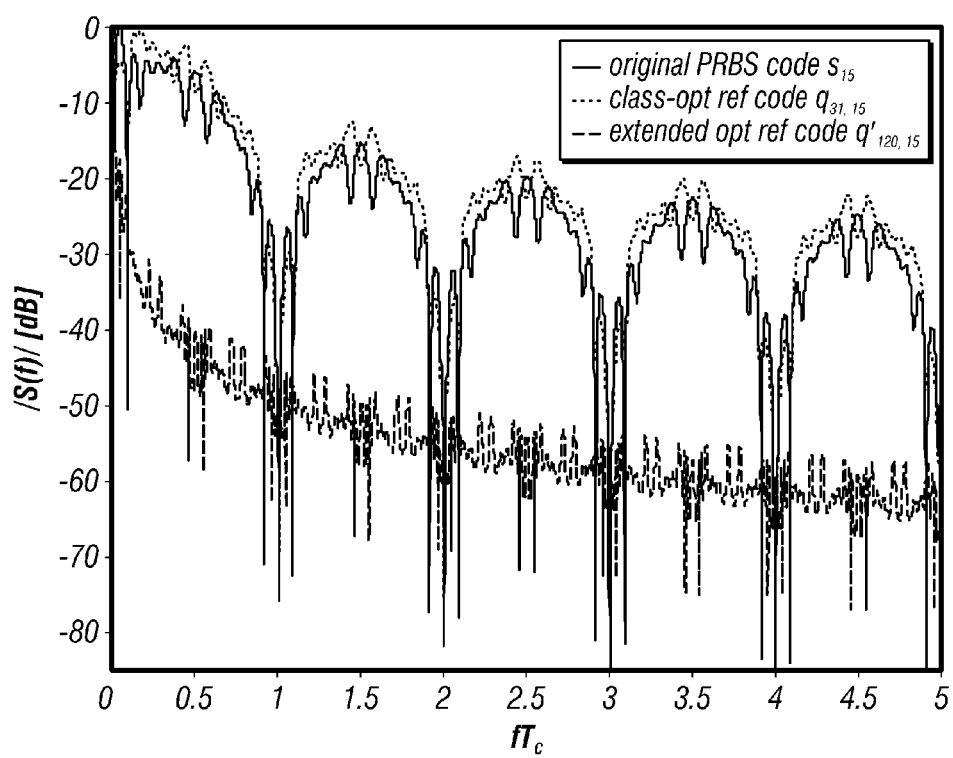

Optimal filtering techniques can be applied to find an optimal reference code q for a transmitted binary signal, s. The cross-correlation between the original and the reference code offers minimal ACF SL levels. This technique works well with codes having some symmetrical or repetitive behavior, such as the Barker codes. It, however, results in increased ACF SL levels for codes with non-repetitive behavior, such as complementary codes and/or PRBS. As an example, compare in FIGS. 2 and 3, respectively, the ACF and the frequency spectrum S(f) pertaining to a widely used M=13 bit Barker code using both standard classical optimal filtering technique and the extended optimal filtering method according to an embodiment of the present invention. For standard classical optimal filtering, a reference code q is generated, with length K=2·M+1. The resulting ACF offers an improvement of 0.6 dB in integrated sidelobe (ISL) level compared to that of the same original Barker code. OBS using classical filtering technique, however, worsens as illustrated in FIG. 3. If the same classical optimal filtering technique is applied to PRBS with length M=15 bits, a slight improvement of 1 dB is seen in the ISL level, while the OBS increases by 1 dB. The classical filtering technique also results in non-symmetric ACF. The corresponding ACF is illustrated in FIG. 4, and the frequency spectrum S(f) of the achieved code is shown in FIG. 5.

The optimal filtering technique is used to obtain the reference code $q=\{q_K\}$ by minimizing the energy E in (3) of the correlation between q and the original signal $s=\{s_M\}$ with K≥M:

$$y = q^* \cdot \Lambda \quad (1)$$

$$\Lambda = \begin{bmatrix} s_K & \cdots & s_2 & s_1 & 0 & \cdots & 0 \\ 0 & s_K & \cdots & s_2 & s_1 & 0 & 0 \\ & & & \cdots & & & \\ 0 & \cdots & 0 & s_K & \cdots & s_2 & s_1 \end{bmatrix}_{K \times (2 \cdot K - 1)} \quad (2)$$

$$E = y \cdot y^H = q^* \cdot (\Lambda \cdot \Lambda^H) \cdot q^T = q^* \cdot A \cdot q^T \quad (3)$$

The solution vector q that minimizes the energy E must satisfy two constraints: the matrix $A_{K \times K} = \Lambda \cdot \Lambda^H$ cannot be singular, and the zero-delay peak should remain unaffected to avoid the ACF distortion. Therefore, (3) is solved subject to the constraint (4):

$$s \cdot q^H = s \cdot s^H \quad (4)$$

resulting in the reference code vector q in (5), $$q_{K,M} = \frac{s \cdot A^{-1} \cdot (s \cdot s^H)}{s \cdot A^{-1} \cdot s^H} \quad (5)$$

with length K≥M.

The reduction in the SL level is proportional to the length K; an obvious fact that larger codes yields lower SL levels. It may also be noted in (5) that if K>M, then the original sequence s={$s_M$} with length M must be filled with (K−M) zeros, such that the elements of s, {$s_{M+1}, s_{M+1}, \ldots, s_K$}=0. If the null elements, {$s_{M+1}, s_{M+1}, \ldots, s_K$} are placed as indicated above, it produces an asymmetrical ACF in terms of unequal distribution of the sidelobes, resulting in large SL levels located close to the main peak. This results in masking the weaker returns from a target located next to a stronger target or a stronger clutter. Therefore, the method of the present invention distributes the (K−M) null elements in (6) such that symmetrical and spread-out SL distribution of the resultant ACF is achieved.

$$s = \{0_{(K-M)/2}, 0_{(K-M-1)/2}, \ldots, s_M, \ldots s_1, \ldots, 0_{(K-M-1)/2}, 0_{(K-M)/2}\}_K \quad (6)$$

This code, however, is not optimum in terms of SL level and OBS capabilities, even when the length K is very large.

The reference code $q_K$ in (5) results in a symmetrical matrix if it is applied to codes with some kind of symmetry or repetitive pattern, such as the Barker code, as explained above. For a transmit sequence with non-repetitive behavior, such as PRBS, a redistribution of (K−M) null elements as indicated in (6) must be adopted to achieve the symmetry. An embodiment of the present invention thus causes a transformation of the original code s={$s_M$}, resulting in a new code s', {$s'_{2M}$}:

$$s' = \{s_1 - s_M s_2 - s_{M-1} s_3 - s_{M-2} \ldots s_M - s_1\}_{2M} \quad (7)$$

If the optimal filter process is now applied to this new code, a reference code $q'_{K'}$ with a length K'=2·K≥2·M that follows the expression in (5) is obtained, with s' in (7) replacing the s.

Applications of Extended Optimal Filters to PRBS

Applying the filtering code in (7) with K'=8·M, M=15, produces the ACF and the frequency spectrum of the code S(f), respectively, shown in FIGS. 4 and 5. It may be noted in FIG. 4 that this embodiment of the present invention results in ACF with a symmetrical pattern for both symmetrical and non-symmetrical codes. The new code optimizes both ACF and its corresponding spectrum S(f) simultaneously, thereby providing significant OBS. Furthermore, the improvement in the ISL reduction is equivalent to an extension of the original signal length from M to 8M.

Simulations have been performed for different values of M within the range [15, $2^{13}$−1] and K'=r·(2·M), r=1, 2, ... note that the ISL improvement $\Delta_{ISL}$ follows (8), while the OBS improvement $\Delta_{OBS}$ follows (9):

$$\Delta_{ISL} = ISL_S - ISL_{q'} 10 \cdot \log_{10}\left(\frac{K'}{M}\right) \text{ [dB]} \quad (8)$$

$$\Delta_{OBS} = OBS_S - OBS_{q'} 10 \cdot \log_{10}\left(\frac{K'^3}{2M^2}\right) \text{ [dB]} \quad (9)$$

The parameter $\Delta_{OBS}$ indicates the ratio between the levels of the first spectral sidelobe corresponding to codes $s_M$ and $q'_{K',M}$, evaluated at 1.5/$T_c$, $T_c$ being the chip period. The value $\Delta_{ISL}$ tends asymptotically to −50 dB after K≥32M. For S(f), the $\Delta_{OBS}$ is about 35.5 dB for K'=8·M, ensuring a minimum OBS improvement of 25 dB when compared to that of K'=2·M. The S(f) power decay for the extended reference code $q'_{K',M}$ can be evaluated using (10):

$$S(f)_{q'K',M'} = 20 \cdot \log_{10}\left(\frac{3M}{K'^2} \cdot \frac{1}{f}\right) \text{ [dB]} \quad (10)$$

The main benefit derived from the use of the extended optimal filter is that both ISL and OBS are reduced in direct proportion to the ratio K'/M without distorting the main ACF peak. The effect on both ISL and OBS is due to the time spreading effect of the optimal filters on the original signal. The reference code q has the same energy as in s, resulting in an unaltered main ACF peak as in (4), and distributing the SL energy by a time spreading factor K'/M.

Applications of Extended Optimal filters to Golay sequences

For the Golay case, the ISL level corresponding to a perfect code is null. So, its spectrum is band-limited to comply with emission regulations or to decrease and/or eliminate the detection and intercept probability. The method outlined for the PRBS case in the previous section is also valid for Golay complementary sequences. The expressions for $\Delta_{OBS}$ and the spectrum decay for the Golay sequences can be shown to follow (11-12):

$$\Delta_{OBS} = 10 \cdot \log_{10}\left(\frac{K'^3}{8M^2}\right) \text{ [dB]} \quad (11)$$

$$S(f)_{q'K',M'} = 20 \cdot \log_{10}\left(\frac{8M}{K'^2} \cdot \frac{1}{f}\right) \text{ [dB]} \quad (12)$$

Figure 6:
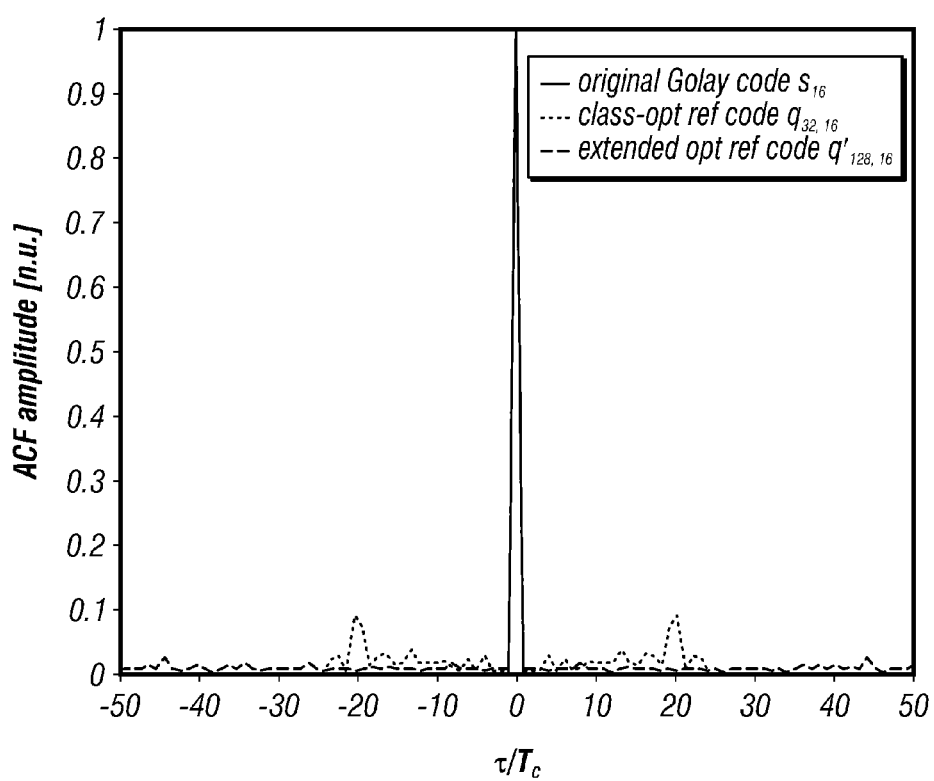
FIGS. 6 and 7 are graphs illustrating the ACF and the frequency spectrum for the cases: (i) original Golay complementary sequences with length M=16; (ii) the classical optimal code with K=32; and (iii) the extended optimal code with K'=128.
Figure 7:
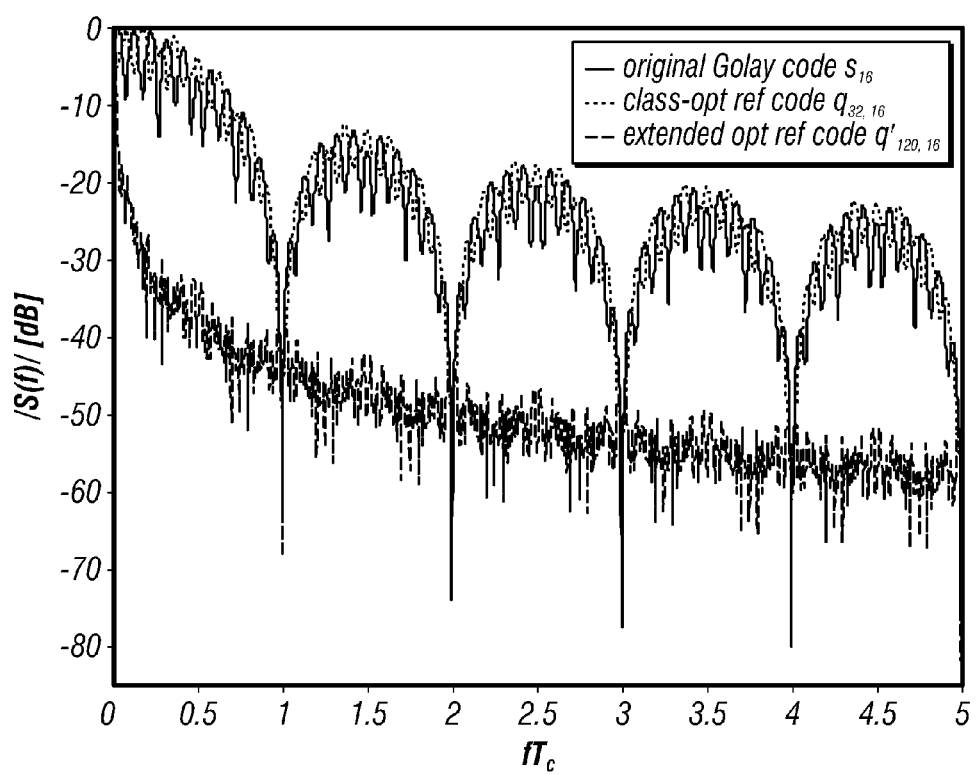

The ACF and S(f) corresponding to the Golay extended optimal filter are illustrated in FIGS. 6 and 7, respectively.

Application of Extended Optimal Filters to Barker Codes

Figure 1:
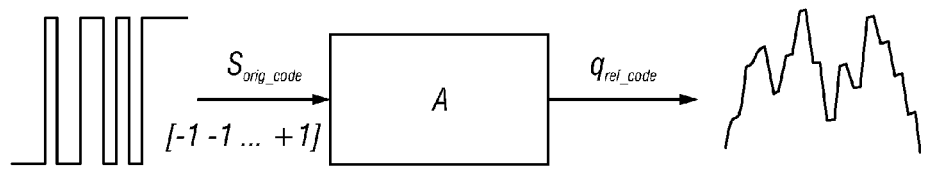
FIG. 1 is drawing illustrating a waveform-filter pair.
Figure 2:
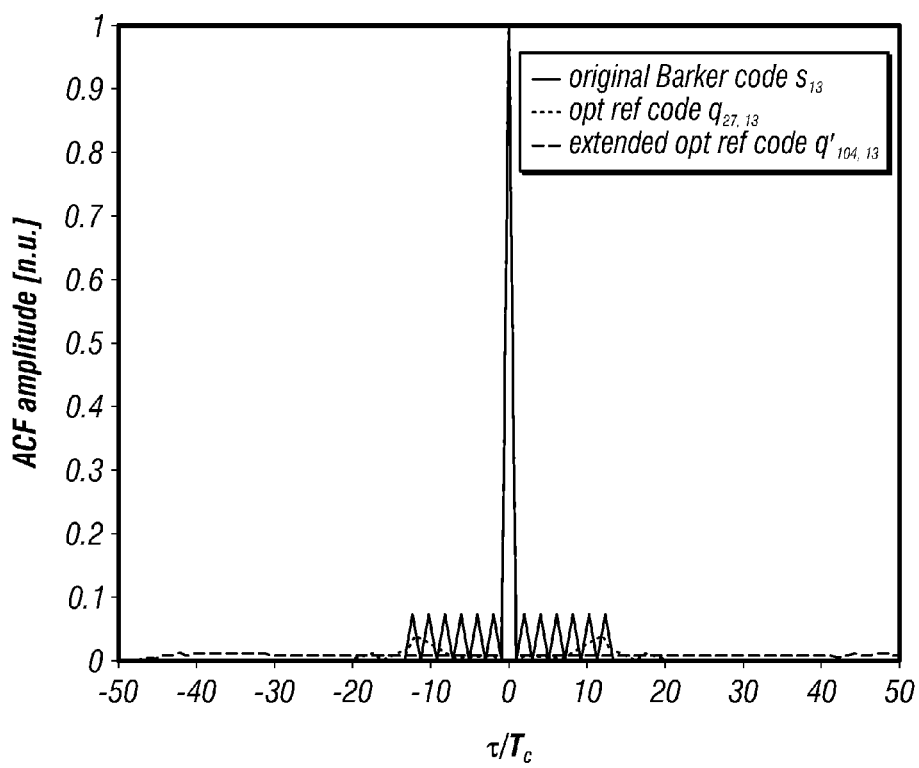
FIGS. 2 and 3 are graphs illustrating the auto-correlation function (ACF) and the frequency spectrum for the cases: (i) original Barker code with length M=13; (ii) the classical optimal code with K=27; and (iii) the extended optimal code with K'=104.
Figure 3:
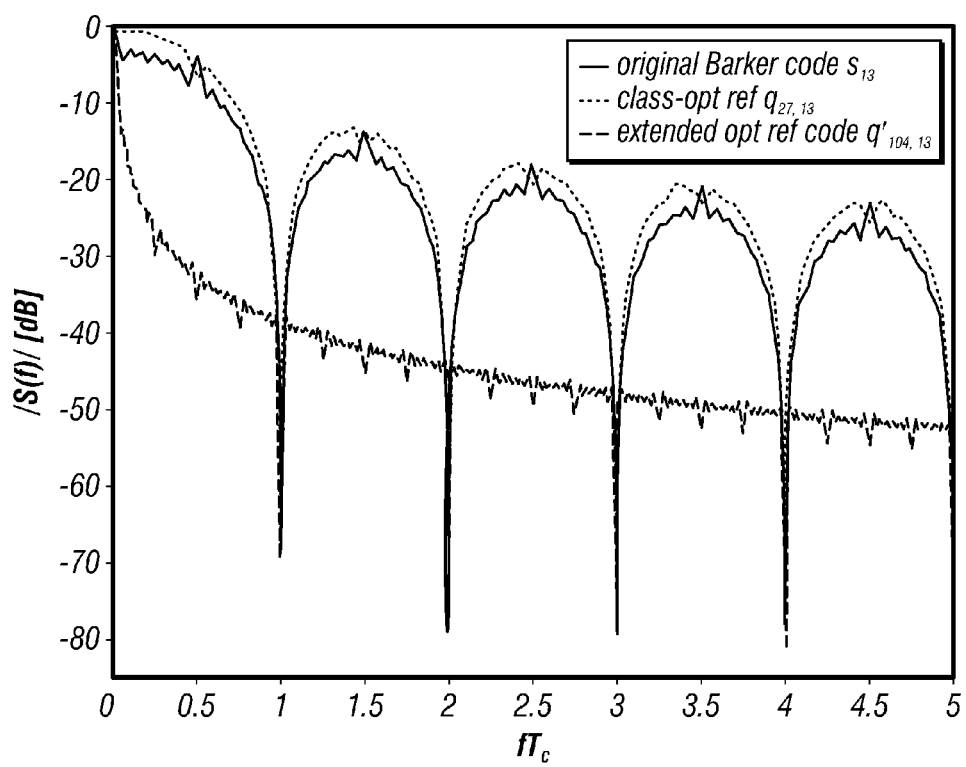

As illustrated in FIGS. 2 and 3, the improvement in terms of both ISL and OBS is also noteworthy when the method of the present invention is used on a 13-bit Barker code, tagged $q'_{104,13}$. The $\Delta_{ISL}$, $\Delta_{OBS}$, and the spectral decay can be shown to follow (13-15).

$$\Delta_{ISL} = 10 \cdot \log_{10}\left(\frac{K'}{2M}\right) \text{ [dB]} \quad (13)$$

$$\Delta_{OBS} = 10 \cdot \log_{10}\left(\frac{K'^3}{4M^2}\right) \text{ [dB]} \quad (14)$$

$$S(f)_{q'K',M'} = 20 \cdot \log_{10}\left(\frac{10M}{K'^2} \cdot \frac{1}{f}\right) \text{ [dB]} \quad (15)$$

Ambiguity Function (AF) |χ(T;V)| Corresponding to PRBS

Figure 8:
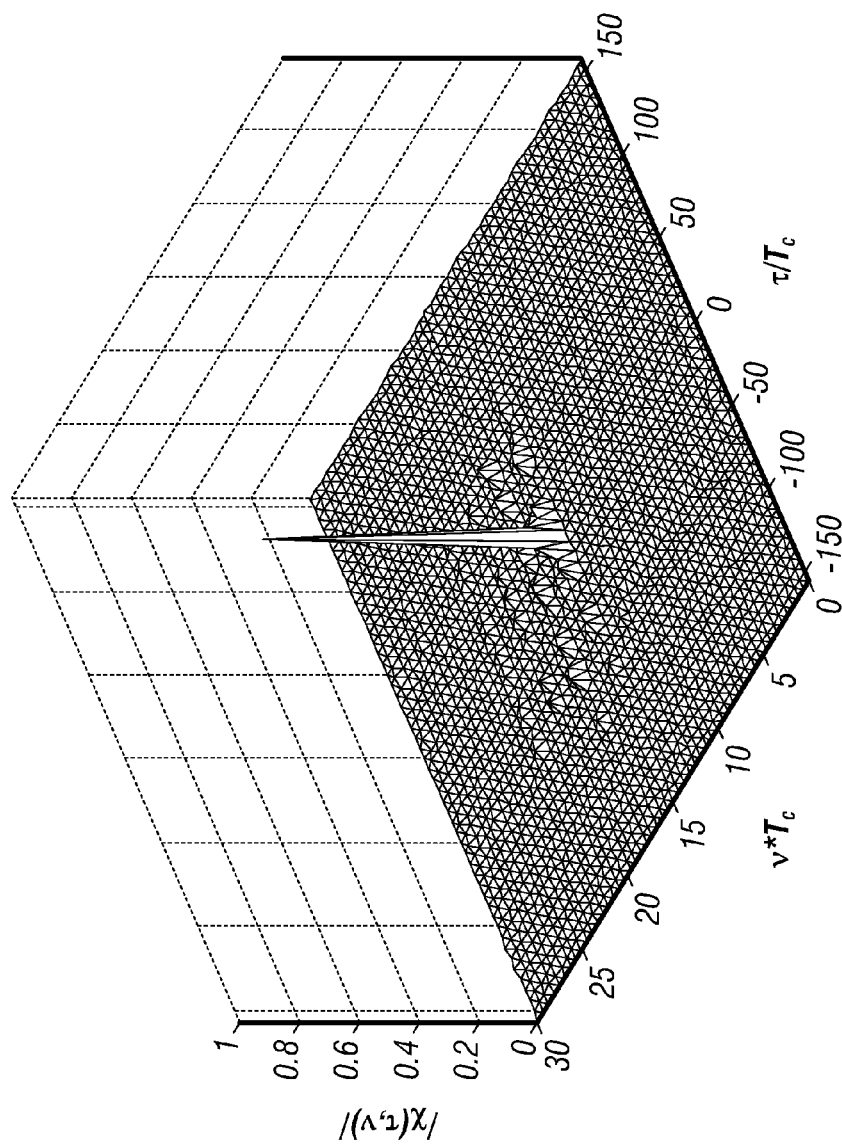
FIG. 8 is a graph illustrating the normalized magnitude of the ACF corresponding to the extended PRBS optimal code with K'=120, M=15.

FIG. 8 illustrates the ACF magnitude corresponding to the PRBS extended code $q'_{120,15}$. A good performance in both range and Doppler shift is observable. The spreading of the SL energy by the spreading factor K'/M is important for this improved performance.

Multipath Capability of Extended Reference Codes

Figure 9:
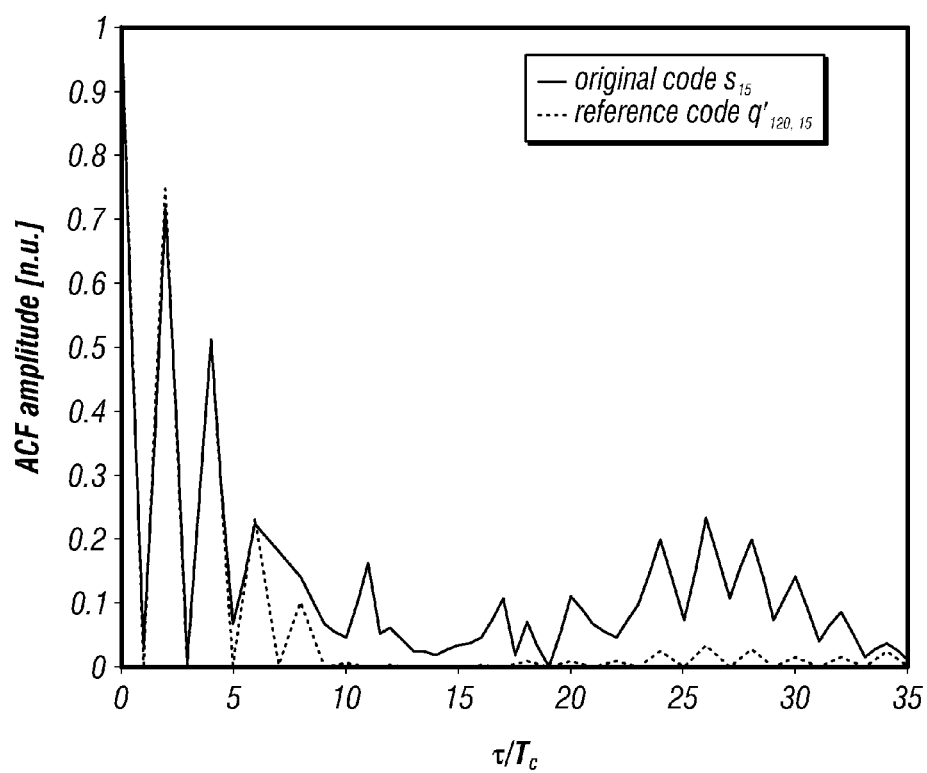
FIG. 9 is a graph illustrating an example of comparison of multipath resolution corresponding to an original PRBS with length M=15 and the related extended optimal code with K'=120.

The multipath detection capability of the original signal $s_M$ is not affected by its transformation into the extended reference code $q'_{K',M}$. FIG. 9 illustrates an example of multipath resolution corresponding to the reference code $q'_{120,15}$ obtained from an original PRBS with length M=15. Four multipath components were placed at delays $2 \cdot T_c$, $4 \cdot T_c$, $6 \cdot T_c$ and $8 \cdot T_c$, with amplitudes of 0.75V, 0.5V, 0.25V and 0.125V respectively. The result shows that the new code $q'_{K',M}$ offers a multipath detection as good as the original signal $s_M$, and this is even better in the case of low level amplitude echoes that can be undetected for the original signal due to the large intrinsic ISL value present in the PRBS.

Embodiments of the present invention simultaneously provide both lower aperiodic autocorrelation function (ACF) sidelobe levels and spectrally clean waveforms with an out-of-band suppression (OBS) level. The main ACF peak remains unaffected, resulting in a larger dynamic range of the system and better ability to detect weaker returns. Embodiments of the present invention also provide a method which is Doppler resistant, and has a good multipath capability. Embodiments of the present invention can also be used in real-time, futuristic, adaptive-on-transmit systems to mitigate the SL noise due to the dynamically changing operational environment. It would only require one to enlarge the code length K' to achieve the desired specifications. Accordingly, at the receiver end, even in presence of adverse conditions, the received signal enables an optimum information retrieval. The no-lobule shape frequency spectrum S(f) achieved by the extended references codes provide better immunity to external electromagnetic interference (EMI), improved spectral efficiency, and immunity to jamming. Accordingly, the extended reference codes also possess narrowband features in its frequency spectrum.

Embodiments of the present invention provide desirable results in the fields of:

1. Digital Communications: The new and emerging radio communications use large bandwidths to achieve higher data rates for various applications as well as a large number of simultaneous users. This spectrum sharing produces several impairments such as the rejection of users that in last-term derives into service quality degradation.

The use of extended reference codes are advantageous in terms of allowing a larger number of users that can be simultaneously serviced by a system with minimum interferences among them. Therefore embodiments of the present invention can affect positively radio budget links, transmission data rate, number of users, service quality, etc. These codes are especially useful in "white-spaces" applications and similar digital communication technologies suffering from heavy load of users and applications-sharing in overcrowded spectrum. "White-spaces" technologies use the spectrum gaps (or space) created by switching off the analog TV between 500 MHz and 3000 MHz. These spectrum gaps are designated to switch into multi-user multi-application (MuMa) environments. Spectrum sharing can be improved by coding communications using the extended references codes of the present invention, thus reducing the frequency bandwidth occupied for each user and application.

When an embodiment of the present invention is applied to orthogonal binary codes, it increases the possibilities for the MuMa technologies.

2. Extreme communications: The lowest narrow-band-like interferences suffered by the codes of the present invention are particularly useful in communications with large number of interferers and jammers, either natural or man-made, for both military and non-military applications. For instance, a communication system can be deployed in any portion of the spectrum due to the small frequency bandwidth required by use of the present invention, thereby avoiding interference with pre-existing systems (multifrequency allocation).

3. Imaging Radar systems: In most radar systems, the presence of SL noise would be reasonable to assume, since the distortion of the transmitted code is not weak even for regular operational conditions, and the frequency bands of many radar systems can be interfered with or jammed through the SL noise. This is the case or airborne radars, ground penetrating radar, through wall imaging, etc.

For radar imaging systems (imaging radar), the range resolution is proportional to the frequency bandwidth used. As a result, high-resolution systems require UWB waveforms (>500 MHz), and for such systems, the SL noise is of great concern. The ability to use the extended references codes with minimum SL would greatly enhance the image quality within a given medium.

4. Low electromagnetic interference applications: the electromagnetic interference is significantly less for the case of extended references codes, due to the narrowband spectrum, thus reducing potential damage to sensitive systems. Embodiments of the present invention can also help in providing a strict frequency mask for UWB waveforms.

5. Safety: the use of extended reference codes can improve significantly the safety level of critical communications, as the ones used by surveillance agencies or homeland security.

6. Instrumentation design: for both purposes of real-time adaptive transmission and reception, specific instrumentation can be designed and implemented. This opens a new field of business and application.

Because embodiments of the present invention provide a method to obtain extended reference codes with optimal performance in terms of ACF ISL and OBS simultaneously, derived from the classical optimal filtering technique and constitutes an SL mitigation approach for the transmitter end. Different kinds of SL reduction techniques, including windowing, coding, mismatched filtering, and other techniques can be used. Accordingly, the extended references codes have the advantage of narrowband-like spectrum in frequency domain. This fact leads to features as important as low probability of detection (LPD) and intercept (LPI), better immunity to external electromagnetic interference (EMI), improved spectral efficiency, and immunity to jamming.

Table I illustrates the comparison of the ACF main peak loss, the sidelobe reduction $\Delta_{ISL}$, and the OBS, $\Delta_{OBS}$ achieved using classical windowing techniques, and the extended optimal filters of the present invention. It may be observed that in terms of OBS, the best performance corresponds to the Blackman window. However, the extended reference codes offer simultaneous improvement in $\Delta_{ISL}$ and $\Delta_{OBS}$ while retaining the main ACF peak unaltered.

Methods of embodiments of the present invention thus offer, among other, the following advantages:

Simultaneous improvement in $\Delta_{ISL}$ and $\Delta_{OBS}$ while retaining the main ACF peak unaltered;

Extended codes can be applied to any symmetric (such as Barker) or non-symmetric codes, such as PRBS;

These codes can be used for AT systems to respond to the changing operational environment by extending the length K' of the code;

A fast and simple procedure to obtain an adaptive SL mitigation technique at the transmitter end;

The parameter K' has been found to be closely related to the value of both ACF sidelobes and out-of-band spectral purity. The last feature related to these codes is of importance in scenarios requiring strict OBS requirements;

Has good range-Doppler and multipath capabilities;

Provides an accurate estimate of the multipath components present in one scenario;

It admits multi-frequency allocation due to the small occupied bandwidth;

It reduces multiuser interferences;

It involves just a few instruments to conduct its generation, based on analog-to-digital conversion jointly to FPGA or DSP platforms, thus enabling mass production at much lower cost;

It enables economically affordable end-products;

It is not tied to a particular system, rather it is portable and can be used for any system and applications mentioned in paragraph [0033]; and It is independent of the type of binary code to be considered in the input.

TABLE I

COMPARISON OF VARIOUS FILTERING AND WINDOWING TECHNIQUES

| Parameter | | ACF peak attenuation [dB] | $\Delta_{OBS}$ [dB] | $\Delta_{ISL}$ [dB] |
|---|---|---|---|---|
| | | Sequence PRBS (M = 15)/Golay (M = 16)/Barker (M = 13) | | |
| Window type | Rectangular | 0/0/0 | −2.04 | 0/0/0 |
| | Hamming | 0.73/1.36/0.73 | 25.5 | −2.93/0/2.67 |
| | Hanning | 0.664/1.78/0.67 | 16.5 | −2.76/0/2.46 |
| | Blackman | 0.577/2.39/0.57 | 41.5 | −3.07/0/2.73 |
| | Kaiser ($\beta = 2\pi$) | 2.76/4.41/2.76 | 30.5 | −2.97/0/2.67 |
| Classical optimal $q_{K=8M+1,M}$ | | 0/0/0 | 1/1/−1 | 3.32/−156.29/0.9 |
| Extended optimal $q'_{K=8M,M}$ | | 0/0/0 | 35.5/30/37 | 9/−154.23/6 |

Embodiments of the present invention are particularly useful for companies involved in digital communications, such as mobile, wireless and radio broadcasting service providers; manufacturers of military and civil radars with application in air traffic control, ground penetrating radar; companies involved in manufacturing medical imaging equipment; companies involved in radar imaging; companies involved in security systems, civilian as well as military; the manufacturers of portable and handheld radio devices for military applications because of the frequency allocation possibility; the multiuser facility can be applied in applications with duty load of spectrum sharing; the medicine instrumentation manufacturers' field—it would represent an important opportunity to improve the radiotherapy treatments; the theoretical improvement in the radar imaging (MRI) quality can become an invaluable improvement for this medical diagnosis tool.

Embodiments of the present invention can provide a competitive advantage to a manufacturing company engaged in marketing RF and Microwave systems, thereby positioning such a company as a leader in many sectors related to the application fields of this invention described in paragraph [0033]. It also enables the subject manufacturer to design and manufacture a core hardware system that can easily be ported, with minimal hardware changes, for various applications by just changing the processing software and algorithms. This becomes a full value chain: from the transmitted waveforms to the receiver end architecture, including the signal processing and presentation of the results.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for transmission and detection in an adaptive-on-transmit (AT) system operating in the electromagnetic spectrum, the method performed on a processor and comprising the steps of:

identifying and selecting an input binary code of length M;

determining a waveform-filter pair (K',M) by deciding filter length K' as an entire multiple of M based on an a-priori desired auto-correlation function sidelobe level reduction, out-of-band spectral suppression, and frequency spectrum power tail power decay, wherein the same are parameterized as a function of K' and solvable a-priori for real-time AT system performance;

determining an intermediate code s" with length K' and formed by interleaving an original code s, a skew-symmetrical flipped version of s, and a symmetrical distribution of (K'−M) null elements that zero-pads a start and end of s";

determining an extended code q' by using a transformation matrix A, wherein q' results in a symmetrical and spread-out sidelobe distribution of a resultant cross-correlation function of the outcome code q; and employing the waveform-filter pair in transmission and detection; and wherein two or more are provided of the group consisting of an auto-correlation function sidelobe level reduction proportional to a the filter length, K, or better, an out-of-band spectral suppression of at least about 40 dB, and a frequency spectrum power tail power decay of $K^{-4}$ or better.

2. The method of claim 1 wherein all three are provided of the group consisting of an auto-correlation function sidelobe level reduction proportional to a the filter length, K, or better, an out-of-band spectral suppression of at least about 40 dB for pseudorandom binary sequences (PRBS), and a frequency spectrum power tail power decay of $K^{-4}$ or better.

3. The method of claim 1 wherein Golay sequences are employed.

4. The method of claim 1 wherein the system is a digital communications system.

5. The method of claim 1 wherein the system is an imaging radar system.

6. A method for transmission and detection in an adaptive-on-transmit (AT) system operating in the electromagnetic spectrum, the method performed on a processor and comprising the steps of:

identifying and selecting an input binary code of length M;

determining a waveform-filter pair (K'M) by deciding filter length K' as an entire multiple of M based on an a-priori desired auto-correlation function sidelobe level reduction, out-of-band spectral suppression, and frequency spectrum power tail power decay, wherein the same are parameterized as a function of K' and solvable a-priori for real-time AT system performance;

determining an intermediate code s″ with length K' and formed by interleaving an original code s, a skew-symmetrical flipped version of s, and a symmetrical distribution of (K'–M) null elements that zero-pads a start and end of s″;

determining an extended code a' by using a transformation matrix A, wherein q' results in a symmetrical and spread-out sidelobe distribution of a resultant cross-correlation function of the outcome code q; and wherein the system generates an auto-correlation function sidelobe level reduction proportional to a the filter length, K, or better, an out-of-band spectral suppression of at least about 40 dB, and a frequency spectrum power tail power decay of $K^{-4}$ or better.

7. The method of claim 6 wherein Golay sequences are employed.

8. The method of claim 6 wherein the system is a digital communications system.

9. The method of claim 6 wherein the system is an imaging radar system.

* * * * *